United States Patent [19]
Demouzon et al.

[11] Patent Number: 5,871,177
[45] Date of Patent: Feb. 16, 1999

[54] REDUNDANT FRONT SUSPENSION SYSTEM FOR A TURBOSHAFT ENGINE

[75] Inventors: Francis Michel Demouzon, Cesson; René Pierre Fer, Dammarte les Lys; Patrick Jean Alibert Huet, Lisses; Laurent Pierre Elysée Gaston Marnas, Vaux le Penil, all of France

[73] Assignee: Societe Nationale d'Etude et de Construction de Moteurs d'Aviation "Snecma", Paris, France

[21] Appl. No.: 974,678

[22] Filed: Nov. 19, 1997

[30] Foreign Application Priority Data

Nov. 21, 1996 [FR] France .................................. 96 14191

[51] Int. Cl.$^6$ .................................................. B64D 27/26
[52] U.S. Cl. ........................... 244/54; 248/554; 60/39.31
[58] Field of Search .................................... 244/53 R, 54, 244/59; 248/554–557; 60/39.31

[56] References Cited

U.S. PATENT DOCUMENTS

| | | | |
|---|---|---|---|
| 3,907,220 | 9/1975 | Amelio ...................................... | 244/54 |
| 4,065,077 | 12/1977 | Brooks . | |
| 4,560,122 | 12/1985 | Parkinson et al. ......................... | 244/54 |
| 5,303,880 | 4/1994 | Cencula et al. ............................ | 244/54 |
| 5,474,258 | 12/1995 | Taylor et al. .............................. | 244/54 |

FOREIGN PATENT DOCUMENTS

| | | |
|---|---|---|
| 2 217 549 | 9/1974 | France . |
| 2 599 708 | 12/1987 | France . |
| 2 680 353 | 2/1993 | France . |
| WO 93/11041 | 6/1993 | WIPO . |

*Primary Examiner*—Galen L. Barefoot
*Attorney, Agent, or Firm*—Oblon, Spivak, McClelland, Maier & Neustadt, P.C.

[57] ABSTRACT

A redundant front suspension system for a turboshaft engine mounted on a pylon of an aircraft comprises a primary suspension device forming the normal front suspension of the engine, and an emergency suspension device which operates in the event of failure of the normal suspension. The primary suspension device comprises a base support which is fixed to the pylon and has a suspension shaft which co-operates with the intermediate casing of the engine. Thrust take-up rods connect the intermediate casing to the base support. The emergency suspension device comprises a first support secured to the pylon and a second support secured to the intermediate casing, each of these two supports having a vertical yoke. The vertical yokes are interconnected by a transverse pin which passes through the yokes with a clearance between the pin and one of the yokes. The second support has a vertical pin which is received with clearance in a bore in a horizontal yoke of the first support, the vertical pin and the horizontal yoke taking up the transverse forces in the event of a rupture of the normal suspension shaft. The vertical yokes take up the longitudinal and vertical forces in the event of a rupture of the normal suspension shaft or of a thrust take-up rod.

6 Claims, 6 Drawing Sheets

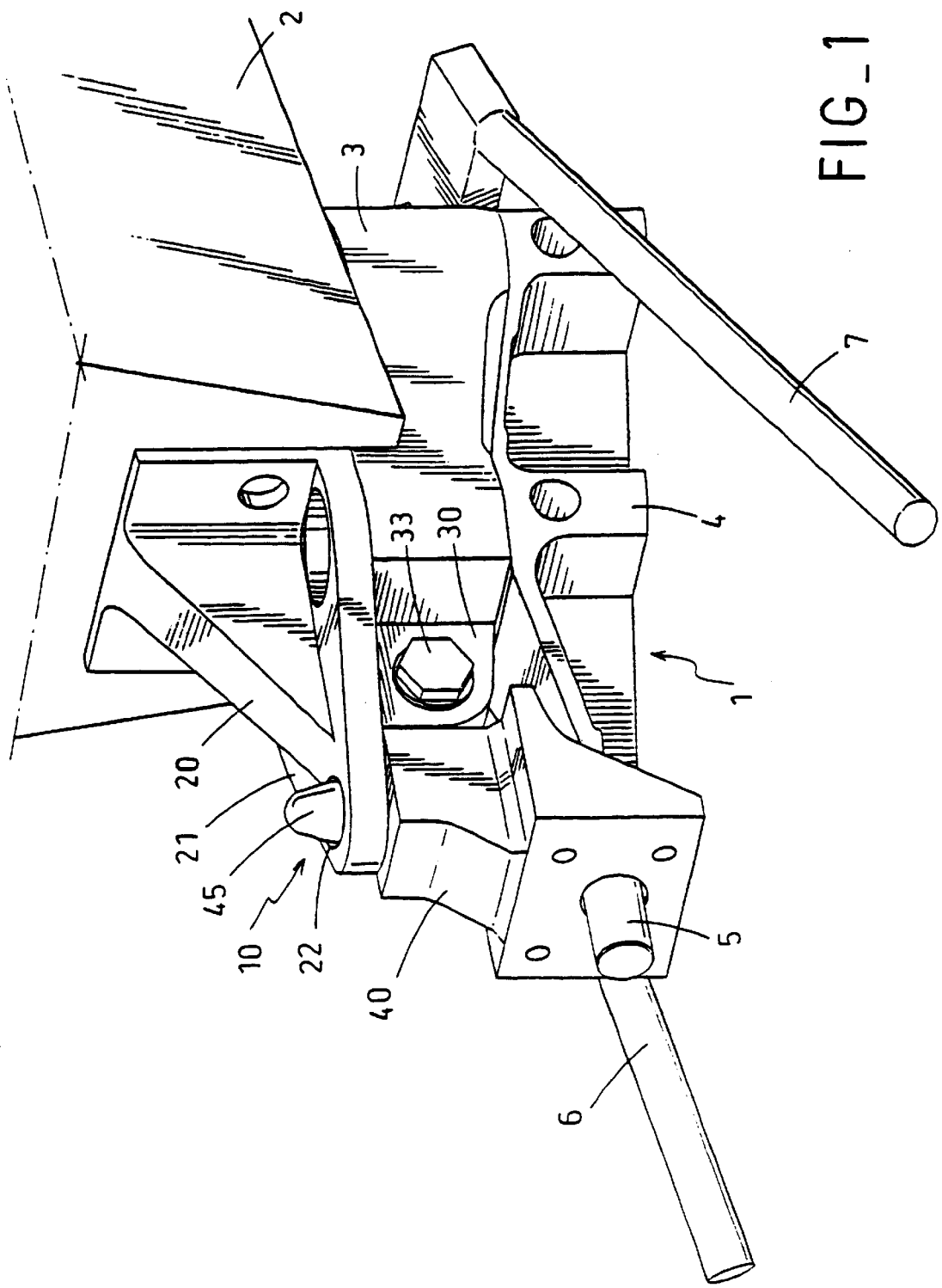
FIG_1

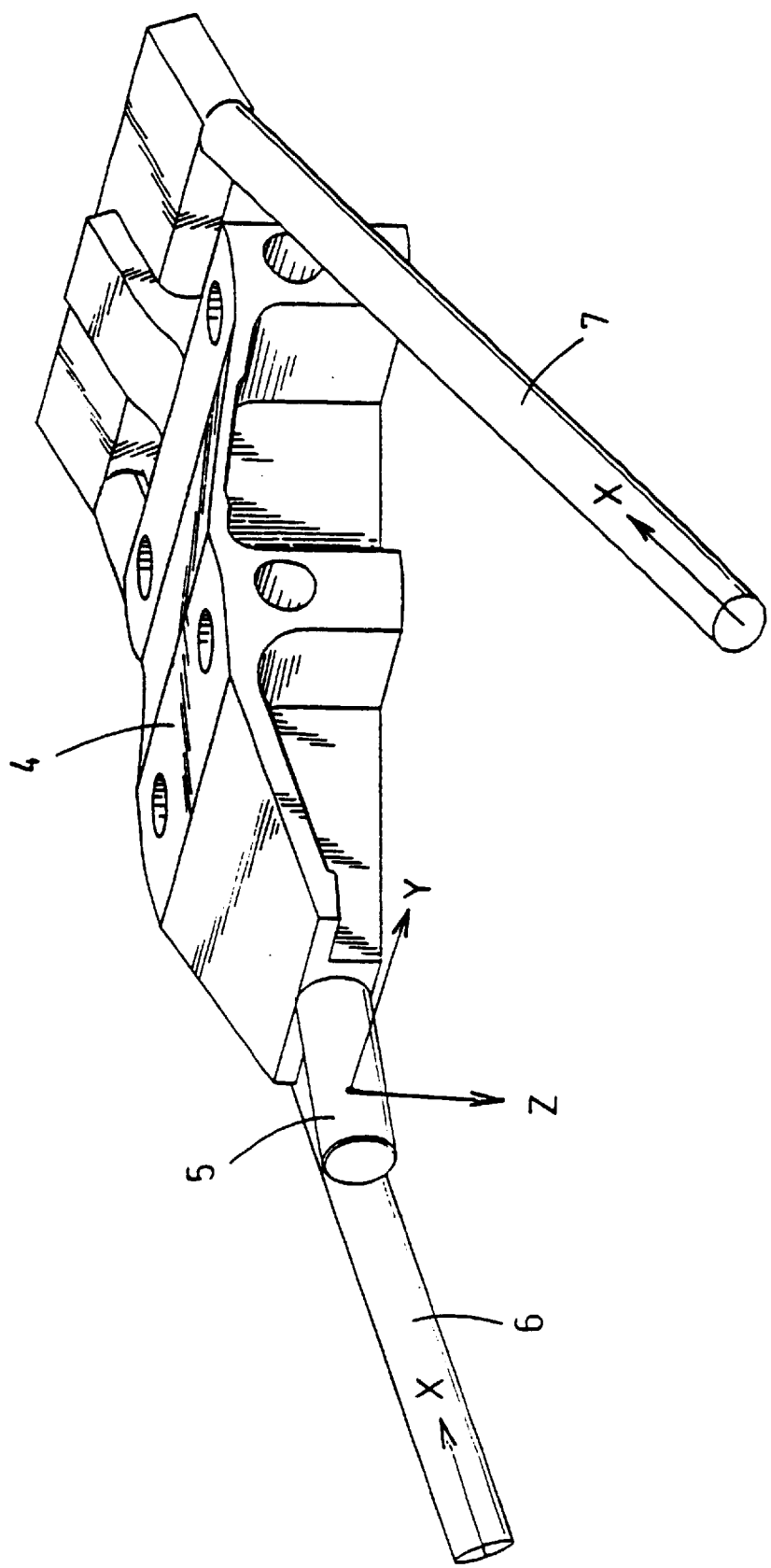
FIG_2

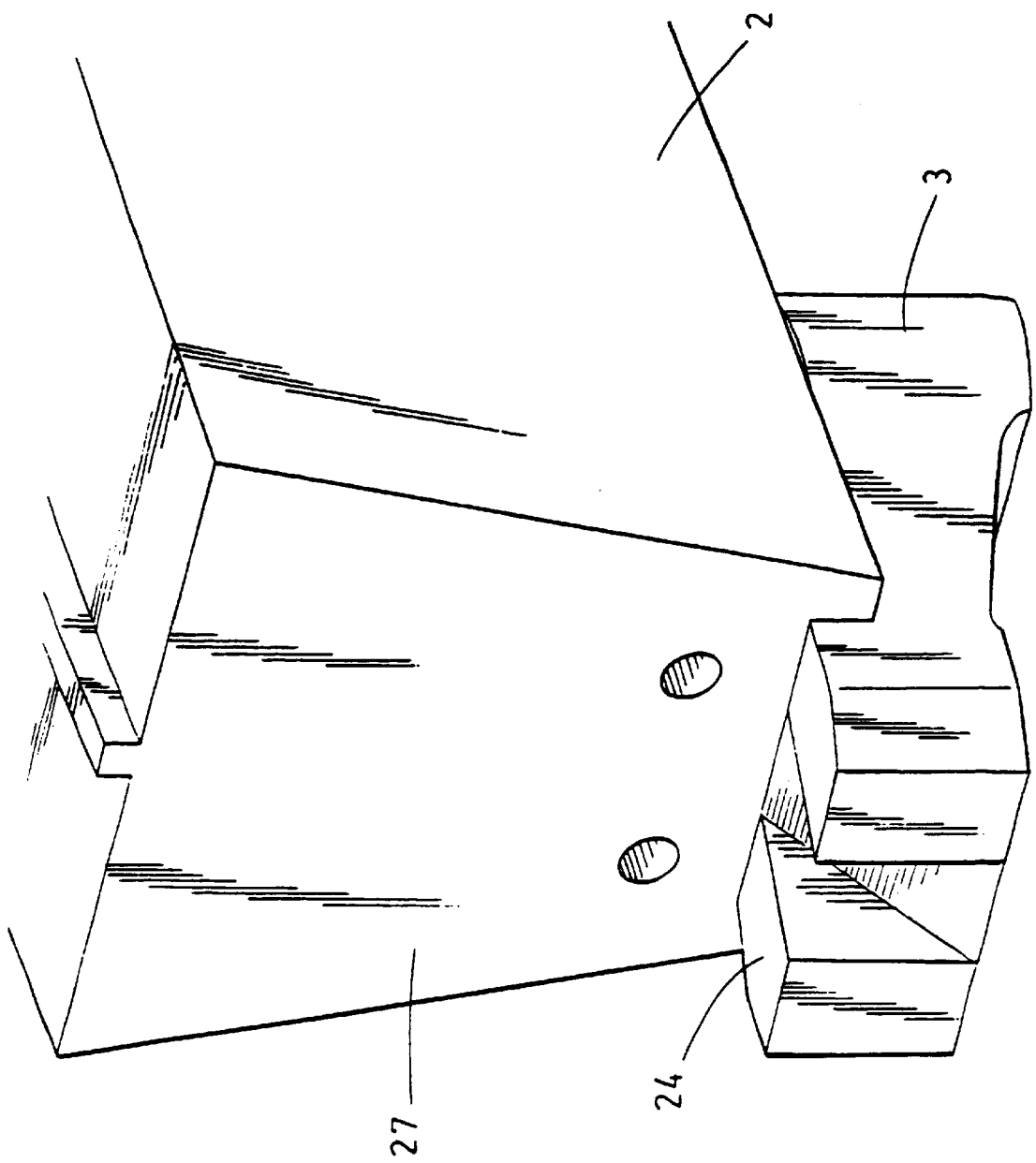

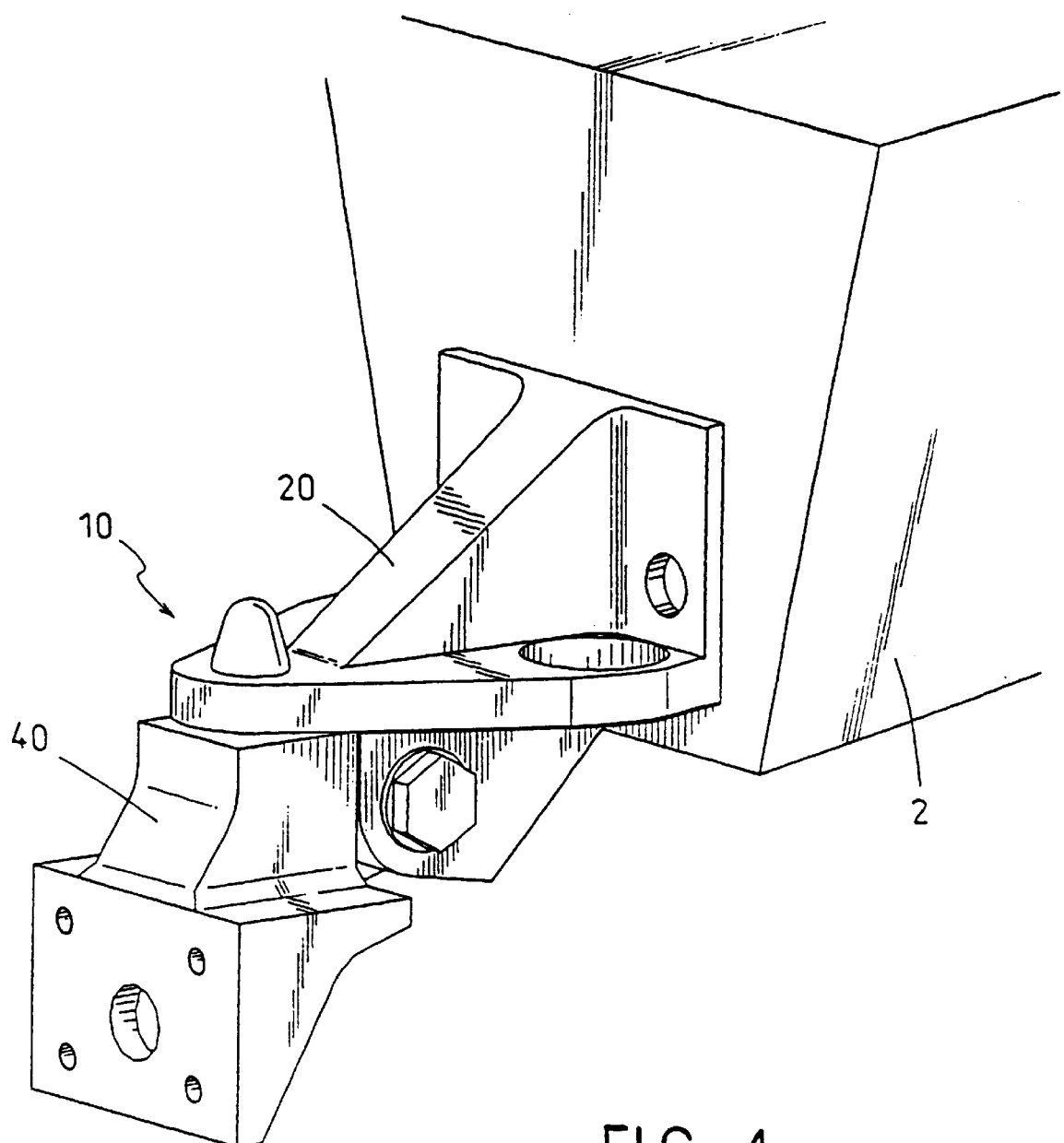
FIG_4

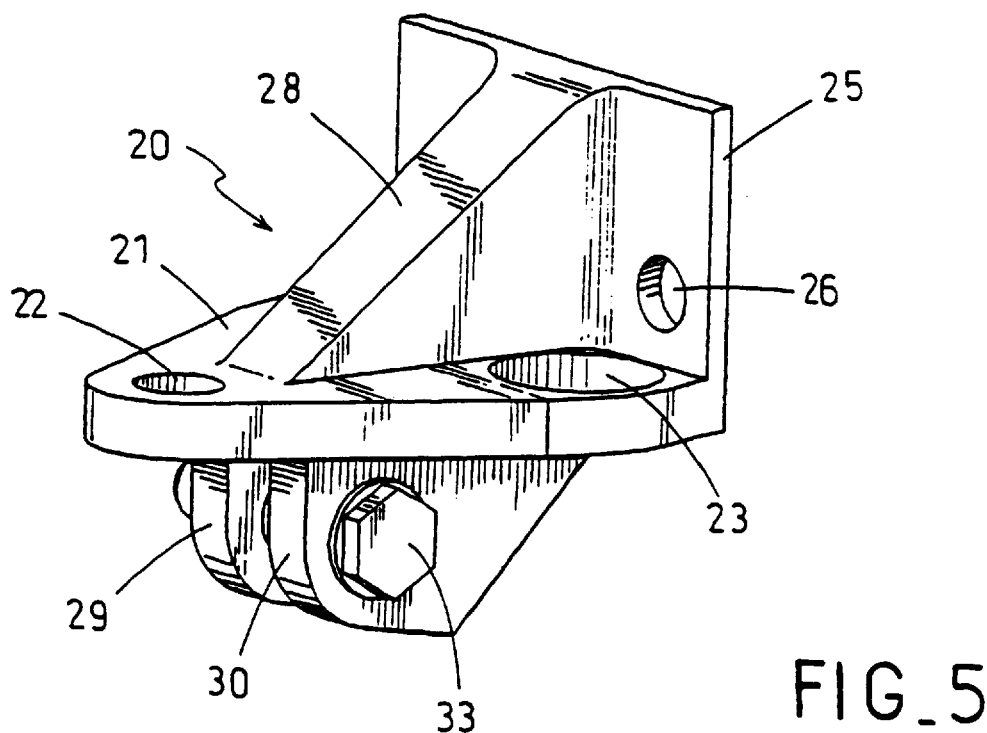
FIG_5
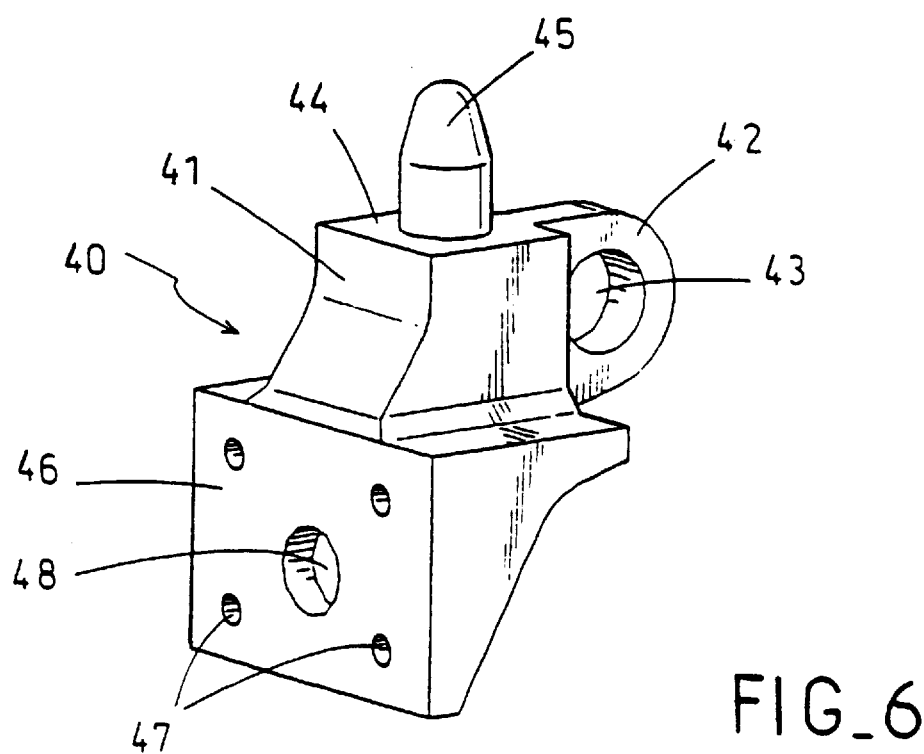
FIG_6

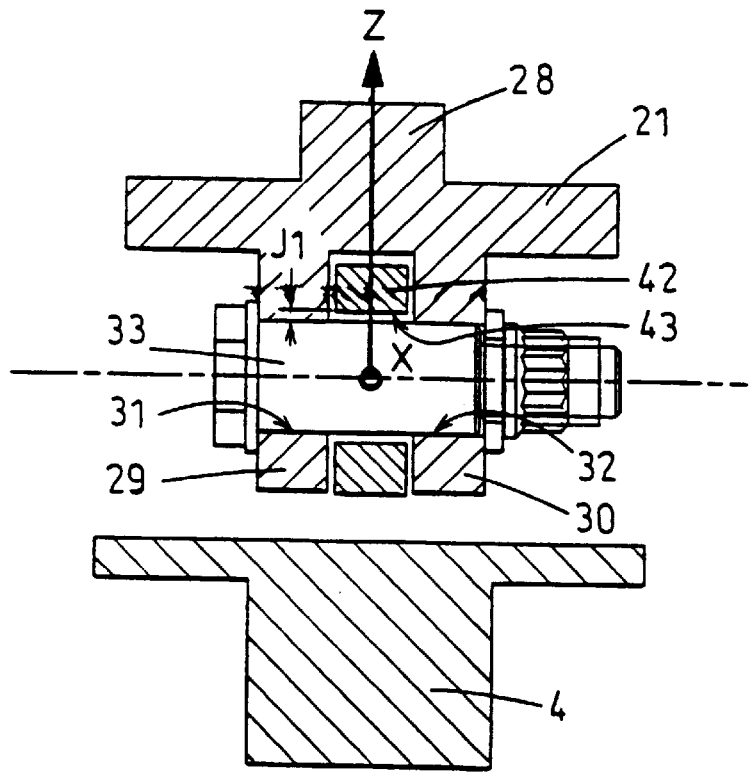
FIG_7
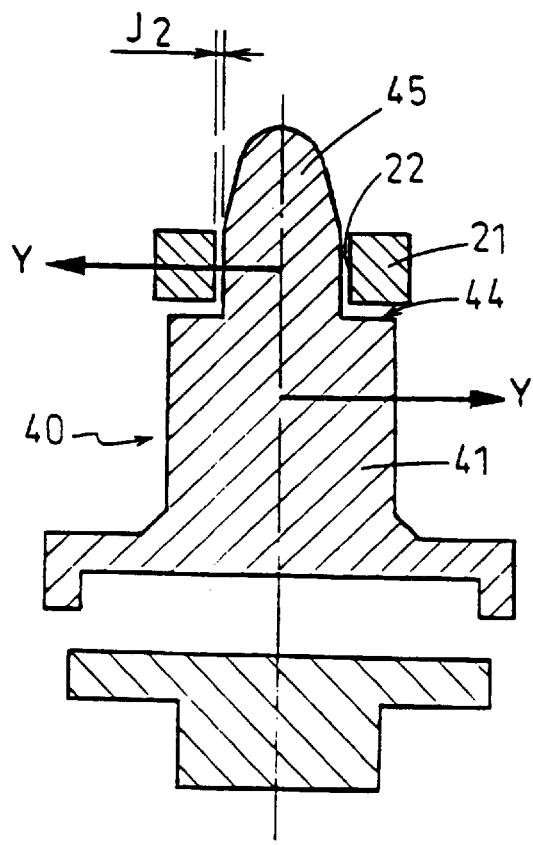
FIG_8

REDUNDANT FRONT SUSPENSION SYSTEM FOR A TURBOSHAFT ENGINE

BACKGROUND OF THE INVENTION

FIELD OF THE INVENTION

The invention relates to a redundant front suspension system for a turboshaft engine mounted on a pylon carried by an aircraft, the word "front" being defined with respect to the direction of flow through the engine to denote that part of the engine which is remote from the flow exhaust zone.

SUMMARY OF THE INVENTION

As is known, an aircraft turboshaft engine is attached to a pylon, which is designed for mechanical transmission of the forces between the engine and the aircraft structure, by means of a front suspension device and a rear suspension device. These suspension devices have to withstand the mechanical forces acting along the vertical axis Z due to the weight of the engine, and the dynamic forces acting along the transverse axis Y caused by the movements of the aircraft. The loads produced by the engine thrust and acting along the longitudinal axis X are transmitted to one of the suspension devices by inclined thrust take-up rods disposed on either side of the engine.

Also, for obvious safety reasons the suspension of the turboshaft engine must include redundancy. For this purpose there are two possible solutions. One is to duplicate all the components of the suspension, each being capable of withstanding the fixed forces by itself, and the other is to add stand-by components which are arranged to withstand the forces only in the event of a failure of the main suspension.

FR-A-2 680 353 discloses a rear connection structure for attaching a turbojet engine to a pylon wherein a mounting is secured to the pylon and is connected to the engine exhaust casing by three suspension rods; the mounting comprising two parts which are fitted one in the other and which are dimensioned such that each is able to take up all the forces transmitted between the casing and the pylon.

FR-A-2 599 708 also discloses a rear connection device for a turbojet engine, wherein there is a provided, in addition to the three known rods, a fourth safety rod which does not take up any load under normal conditions.

Both of these documents relate only to the rear suspension, and make no reference to means for taking up the considerable X-axis thrust loads in the event of failure of a thrust take-up rod or of the suspension means which normally deals with the load of such rods.

SUMMARY OF THE INVENTION

It is an object of the invention to provide a redundant front suspension system for a turboshaft engine mounted on a pylon wherein the normal front suspension is provided with stand-by components adapted to take the forces acting along one or more of the X, Y and Z-axes in the event of a failure of the normal suspension.

Accordingly, the invention provides a redundant front suspension system for a turboshaft engine mounted on a pylon carried by an aircraft, said suspension system comprising a primary suspension device which functions as the normal front suspension of said engine, and an emergency suspension device which operates only in the event of a failure of said primary suspension device, said primary suspension device comprising a base support which is secured to said pylon and is connected to the intermediate casing of said engine, and thrust take-up rods interposed between said base support and said engine, said base support being adapted to provide mechanical transmission of the forces acting along a transverse axis Y and a vertical axis Z between said primary suspension device and said pylon as well as transmission to said pylon of the engine thrust forces which act along a longitudinal axis X and which are transmitted by said thrust take-up rods, and said emergency suspension device comprising a first support which is fixed to said pylon and has a vertical yoke adapted to take up the X and Z-axes forces and a horizontal yoke adapted to take up the Y-axis forces, a second support which is secured to said intermediate casing of said engine and has a vertical yoke adapted to take up said X and Z-axes forces and a vertical pin adapted to take up said Y-axis forces, and a transverse connecting pin, said horizontal yoke of said first support having a bore in which said vertical pin is received with a clearance, and said vertical yokes of said first and second supports having respective axially aligned bores for the passage of said transverse connecting pin, said transverse pin being secured to one of said vertical yokes and passing with a clearance through the bore of the other of said vertical yokes.

In normal operation only the base support receives the forces and loads transmitted between the engine and the pylon, the first and second supports being mechanically isolated because of the clearances between the vertical and transverse pins and the bores in which they are received.

Preferably, the vertical yoke of the first support comprises two lugs which are disposed on opposite sides of the vertical yoke of the second support without contact therewith. In this case the transverse connecting pin is preferably secured to the lugs.

Preferably the vertical yoke of the first support extends beneath the under surface of the horizontal yoke of the first support, and the bore in said horizontal yoke of the first support is preferably disposed in a forward part of the horizontal yoke in front of the vertical yoke.

The first support may also have a vertical plate projecting upwardly from a rear edge of said horizontal yoke for securing said first support to said pylon, and a stiffening wall interconnecting said vertical plate and the upper surface of said horizontal yoke.

Other preferred features and advantages of the invention will become apparent from the following description of a preferred embodiment with reference to the accompanying drawings.

BRIEF DESCRIPTION OF THE DRAWINGS

FIG. 1 is a perspective view of a preferred embodiment of the redundant front suspension system in accordance with the invention, the drawing showing a portion of the aircraft pylon to which the system is attached but not showing any of the turboshaft engine for the sake of clarity.

FIG. 2 is a perspective view of the primary suspension device of the suspension system of FIG. 1, including the thrust take-up rods.

FIG. 3 shows part of the aircraft pylon and its heel on which the suspension system is mounted.

FIG. 4 is a perspective view of the emergency suspension device of the suspension system.

FIG. 5 is a perspective view of just the first support of the emergency suspension device.

FIG. 6 is a perspective view of just the second support of the emergency suspension device.

FIG. 7 is a transverse section through the front suspension system shown in FIG. 1, taken in a plane perpendicular to the longitudinal axis X and passing through the axis of the transverse pin interconnecting the first support and the second support of the emergency suspension device.

FIG. 8 is a transverse section through the front suspension system shown in FIG. 1 taken in a plane perpendicular to the longitudinal axis X and passing through the axis of the vertical pin of the second support of the emergency suspension device.

DESCRIPTION OF THE PREFERRED EMBODIMENT

FIG. 1 shows a redundant front suspension system 1 for mounting a turboshaft engine on the pylon 2 of an aircraft. The engine is not shown for the sake clarity, but it is sufficient to know that the front suspension point of the engine is located on the intermediate casing thereof.

The pylon 2 is fitted with a heel 3 to which the suspension system 1 is secured as is shown in FIG. 1. The suspension system 1 includes a primary suspension device which forms the normal front suspension of the turboshaft engine and which comprises a base support 4 as shown in FIGS. 1 and 2. The base support 4 is secured to the underside of the heel 3 and extends towards the front of the aircraft in the direction of flight. At its front end the base support 4 has a support shaft 5 which extends forwardly in the direction of the longitudinal axis X of the aircraft reference trihedron and which constitutes the forward suspension shaft for the engine. The shaft 5 serves to take up the forces acting along the vertical axis Z and the transverse axis Y of the reference trihedron, these forces being produced by the weight of the engine, and by dynamic forces resulting from vertical and lateral accelerations caused by vertical and lateral movements of the aircraft. At the rear end of the base support 4 are attached thrust take-up rods 6, 7 which extend forwardly at an angle to the longitudinal axis X and have their front ends secured laterally to the intermediate casing of the engine. The rods 6, 7 transmit the forces produced by the engine thrust, which acts in the direction of the longitudinal axis X of the reference trihedron.

In addition to the normal suspension described above, the suspension system 1 includes an emergency suspension device 10 which operates only in the event of a failure of the normal suspension.

The emergency suspension device 10 comprises a first support 20 which is secured to the pylon 2, and a second support 40 which is secured to the intermediate casing of the turboshaft engine. The first support 20 is shown in FIGS. 1, 4 and 5, and the second support 40 is shown in FIGS. 1, 4 and 6.

The first support 20 comprises a horizontal yoke plate 21 which is provided with a vertical bore 22 near its front edge and with holes 23 near its rear edge, the holes 23 permitting the support 20 to be bolted to the top front part 24 of the heel 3 of the pylon 2. A flange 25 extends vertically upwards from the rear edge of the horizontal yoke plate 21 and is formed with holes 26 by means of which it is bolted to the front wall 27 of the pylon 2. A vertical stiffening wall 28 interconnects the front face of the flange 25 and the upper face of the horizontal yoke plate 21. Disposed beneath the horizontal yoke plate 21 and rearwardly of the vertical bore 22 the first support 20 has a vertical yoke formed by two parallel lugs 29, 30 which extend in planes parallel to the X-axis and Z-axis of the reference trihedron. The lugs 29, 30 are provided with coaxial aligned bores 31, 32 adapted to receive a transverse pin 33. The first support 20 is a unitary item and is dimensioned such that, in the event of a failure of the normal suspension, the lugs 29, 30 can take up the forces produced by the turboshaft engine along the X and Z-axes, and the horizontal yoke plate 21 can take up the forces produced by the engine along the Y-axis.

The second support 40, which is also a unitary member, comprises a body 41 which is in the shape of a truncated pyramid and which has a vertical rear face from which projects a vertical yoke 42 in the form of a lug provided with a bore 43, and a top face 44 from which a vertical pin 45 projects. A plate 46 is disposed below the body 41 and extends parallel to the Y and Z-axes, the plate being provided with holes 47 by which the second support 40 can be bolted to the intermediate casing of the engine. The plate 46 is also provided with a bore 48 through which the support shaft 5 of the base support 4 passes with a clearance allowing lateral movements relative to each other. The second support 40 is dimensioned such that, in the event of a failure of the normal suspension, the vertical yoke 42 can withstand the X and Z-axes forces exerted by the engine, and the pin 45 can take up the Y-axis forces.

The dimensions of the first and second supports 20 and 40 are such that when the turbomachine is suspended on the pylon 2 by way of the primary suspension device and the first and second supports 20 and 40 are secured to the pylon and the intermediate casing respectively, the vertical pin 45 is located with a clearance J2 in the bore 22 of the horizontal yoke 21 of the first support, the vertical yoke 42 of the second support 40 is disposed with clearance between the lugs 29 and 30 of the first support 20 so that the bore 43 is substantially aligned with the bores 31 and 32, and the transverse pin 33 extends through all three bores 31, 43 and 32, the pin 33 being secured to the lugs 29, 30 and passing with a clearance J1 through the bore 43 of the yoke 42 as shown in FIGS. 7 and 8. These figures also show that the top surface 44 of the second support 40 is spaced from the bottom surface of the horizontal yoke 21 of the first support, and that the first and second supports do not touch the base support 4 of the normal suspension device.

In the absence of any failure of the base support 4 and the thrust rods 6, 7 there is no active connection between the first support 20 and the second support 40.

In the event of a failure of the normal suspension as a result of rupture of the support shaft 5 of the base support 4, the Y-axis forces are taken up by the vertical pin 45 and the horizontal yoke 21 of the first support 20, and the Z-axis forces are taken up by the vertical yoke 42 of the second support 40, the transverse pin 33 and the lugs 29 and 30. The X-axis loads continue to be taken up by the rods 6 and 7.

In the event of a rupture of one of the thrust take-up rods 6 and 7, the X-axis loads are taken up by the vertical yoke 42 of the second support 40, the transverse pin 33 and the lugs 29, 30, whereas the Y and Z-axes forces continue to be taken up by the base support 4 and the shaft 5.

Finally, in the event of a rupture of the shaft 5 and one of the rods 6 and 7, all the forces and loads are transmitted by way of the second support 40 to the first support 20.

In the embodiment described, the first support 20 is mounted on the heel 3, but these two components could of course be combined in the form of a unitary component.

We claim:

1. A redundant front suspension system for a turboshaft engine mounted on a pylon carried by an aircraft, said suspension system comprising a primary suspension device which functions as the normal front suspension of said engine, and an emergency suspension device which operates only in the event of a failure of said primary suspension device, said primary suspension device comprising a base support which is secured to said pylon and is connected to the intermediate casing of said engine, and thrust take-up rods interposed between said base support and said engine, said base support being adapted to provide mechanical transmission of the forces acting along a transverse axis Y and a vertical axis Z between said intermediate casing and said pylon as well as transmission to said pylon of the engine thrust forces which act along a longitudinal axis X and which are transmitted by said thrust take-up rods, and said emergency suspension device comprising a first support which is fixed to said pylon and has vertical yoke adapted to take up the X and Z-axes forces and a horizontal yoke adapted to take up the Y-axis forces, a second support which is secured to said intermediate casing of said engine and has a vertical yoke adapted to take up said X and Z-axes forces and a vertical pin adapted to take up said Y-axis forces, and a transverse connecting pin, said horizontal yoke of said first support having a bore in which said vertical pin is received with a clearance, and said vertical yokes of said first and second supports having respective axially aligned bores for the passage of said transverse connecting pin, said transverse pin being secured to one of said vertical yokes and passing with a clearance through the bore of the other of said vertical yokes.

2. A suspension system according to claim 1, wherein the vertical yoke of said first support comprises two lugs which are disposed on opposite sides of the vertical yoke of said second support without contact therewith.

3. A suspension system according to claim 2, wherein said transverse connecting pin is secured to said lugs.

4. A suspension system according to claim 1, wherein the vertical yoke of said first support extends beneath the under surface of said horizontal yoke of said first support.

5. A suspension system according to claim 4, wherein said bore of said horizontal yoke of said first support is disposed in a forward part of said horizontal yoke in front of said vertical yoke of said first support.

6. A suspension system according to claim 1, wherein said first support also has a vertical plate projecting upwardly from a rear edge of said horizontal yoke for securing said first support to said pylon, and a stiffening wall interconnecting said vertical plate and the upper surface of said horizontal yoke.

* * * * *